United States Patent
Michaelis et al.

(10) Patent No.: US 11,838,331 B2
(45) Date of Patent: Dec. 5, 2023

(54) ENDPOINT CONTROL OVER A TEXT CHANNEL OF A REAL-TIME COMMUNICATION SESSION

(71) Applicant: Avaya Management L.P., Durham, NC (US)

(72) Inventors: Paul Roller Michaelis, Louiseville, CO (US); Richard Alan Windhausen, Boulder, CO (US)

(73) Assignee: Avaya Management L.P., Morristown, NJ (US)

( * ) Notice: Subject to any disclaimer, the term of this patent is extended or adjusted under 35 U.S.C. 154(b) by 0 days.

(21) Appl. No.: 17/559,151

(22) Filed: Dec. 22, 2021

(65) Prior Publication Data

US 2023/0199032 A1 Jun. 22, 2023

(51) Int. Cl.
- *G06F 15/16* (2006.01)
- *H04L 65/1059* (2022.01)
- *H04L 9/40* (2022.01)
- *H04L 65/65* (2022.01)
- *H04L 65/401* (2022.01)

(52) U.S. Cl.
CPC ...... *H04L 65/1059* (2013.01); *H04L 63/0869* (2013.01); *H04L 65/401* (2022.05); *H04L 65/65* (2022.05)

(58) Field of Classification Search
CPC . H04L 65/1059; H04L 63/0869; H04L 65/65; H04L 65/401
USPC ........................................................ 709/217
See application file for complete search history.

(56) References Cited

U.S. PATENT DOCUMENTS

| | | | | |
|---|---|---|---|---|
| 10,735,597 B1* | 8/2020 | Zagorski | ............. | H04L 65/1089 |
| 11,317,020 B1* | 4/2022 | Krishnamurthy | ...... | H04N 23/62 |
| 2018/0061403 A1* | 3/2018 | Devaraj | .................. | G06F 3/167 |
| 2019/0080375 A1* | 3/2019 | Alvarez | ................. | H04N 7/147 |
| 2019/0387401 A1* | 12/2019 | Liao | .................. | H04W 28/0289 |
| 2020/0234697 A1* | 7/2020 | Webster | .................. | G10L 13/00 |
| 2021/0081163 A1* | 3/2021 | Buckley | .................. | G06F 3/165 |

(Continued)

FOREIGN PATENT DOCUMENTS

WO WO-2022000755 A1 * 1/2022 ............ B25J 9/1697

OTHER PUBLICATIONS

R. Even et al. "MIME Type Registration for RTP Payload Format for H.224," downloaded Apr. 21, 2022 from https://datatracker.ietf.org/doc/html/rfc4573, 7 pages.

(Continued)

*Primary Examiner* — Lan Dai T Truong

(57) ABSTRACT

The technology disclosed herein enables remote control of an endpoint via a media channel of a real-time telecommunication session in a manner that can use standard media encoding and transmission methods. In a particular embodiment, a method includes, in a first endpoint operated by a first user, receiving text from a second endpoint over a text channel of a real-time communication session established between the first endpoint and the second endpoint. The text channel enables exchanging text-based user communications between the first endpoint and the second endpoint during the communication session. The method includes determining that a text transmission from the second endpoint includes a control instruction for the first endpoint and complying with the control instruction.

20 Claims, 10 Drawing Sheets

(56) References Cited

U.S. PATENT DOCUMENTS

2021/0211411 A1* 7/2021 Jakobsson ........... H04L 63/0245
2021/0314748 A1* 10/2021 Cominetti ............. H04L 9/3247
2022/0057989 A1* 2/2022 Watanabe ............. G06F 3/0485

OTHER PUBLICATIONS

Poly Group Series Remote Control, downloaded on Apr. 21, 2022 from https://www.poly.com/us/en/products/video-conferencing/accessories/remote-control, 4 pages.
PTZ PRO 2, downloaded on Apr. 21, 2022 from https://www.logitech.com/en-gb/products/video-conferencing/conference-cameras/ptz-pro2-conferencecam.960-001186.html, 9 pages.
https://support.zoom.us/hc/en-us/articles/203028599-far-end-camera-control, downloaded on Apr. 21, 2022, 2 pages.
How to enable Far end camera control feature, downloaded on Apr. 21, 2022 from https://support.ringcentral.com/article/10766-RingCentral-Meetings-Far-end-camera-control-Host.html, 3 pages.
Far-End Camera Control with WebRemote, downloaded on Apr. 21, 2022 from https://www.rocosoft.com/knowledge-base/controlling-cameras/far-end-camera-control-web-remote/, 6 pages.
User Guide for Avaya XT Series, downloaded on Apr. 21, 2022 from https://downloads.avaya.com/css/P8/documents/101059542, 140 pages.

\* cited by examiner

US 11,838,331 B2

ENDPOINT CONTROL OVER A TEXT CHANNEL OF A REAL-TIME COMMUNICATION SESSION

TECHNICAL BACKGROUND

There are situations where the ability to support remote control of a telecommunications endpoint would be beneficial. For example, a user of an endpoint may not know how to change a setting on that endpoint or may not know to what state the setting should be changed. Standards such as RFC-4573 and ITU-T H.281 support remote control of telecommunication endpoints. A problem is that nonstandard software is needed on the controlling endpoint in order to create and transmit the commands. Another problem is that the ability to control a far-end endpoint may be limited to the feature set that was anticipated when the standards were created. For instance, RFC-4573 is intended for far-end camera control during video telecommunication sessions and, therefore, may not support control of a remote endpoint's non-camera components.

SUMMARY

The technology disclosed herein enables remote control of an endpoint via a media channel of a real-time telecommunication session in a manner that can use standard media encoding and transmission methods. In a particular embodiment, a method includes, in a first endpoint operated by a first user, receiving text from a second endpoint over a text channel of a real-time communication session established between the first endpoint and the second endpoint. The text channel enables exchanging text-based user communications between the first endpoint and the second endpoint during the communication session. The method includes determining that a text transmission from the second endpoint includes a control instruction for the first endpoint and complying with the control instruction.

In some examples, determining that the text includes the control instruction comprises identifying a predefined one or more characters in the text that differentiates the control instruction from other text transmitted over the text channel to the first endpoint.

In some examples, in response to determining that the text should be displayed to the first user, the method includes displaying the text to the first user.

In some examples, the real-time communication session includes a voice channel and the control instruction directs the first endpoint to adjust audio settings for audio transmitted to the second endpoint over the voice channel.

In some examples, the real-time communication session includes a video channel and the control instruction directs the first endpoint to adjust video settings for video transmitted to the second endpoint over the video channel.

In some examples, the real-time communication session includes a media channel and the control instruction directs the first endpoint to adjust media presentation settings for media received from the second endpoint over the media channel.

In some examples, the method includes receiving user input from the first user allowing the endpoint to comply with the control instruction. The user input may indicate features of the first endpoint that are allowed to be controlled by the control instruction.

In some examples, the method includes validating that the text is received from the second endpoint. The validating may include performing a mutual-authentication process between the first endpoint and the second endpoint and/or determining that the text is received from a same source as media packets for the real-time communication session.

In some examples, the text channel comprises first Real-time Transport Protocol (RTP) packets transmitted with second RTP packets of the real-time voice channel.

In another examples, an apparatus includes one or more computer readable storage media and a processing system operatively coupled with the one or more computer readable storage media. Program instructions stored on the one or more computer readable storage media, when read and executed by the processing system, direct the processing system to receive text from a second endpoint over a text channel of a real-time voice communication session established between the first endpoint and the second endpoint. The text channel enables exchanging text-based user communications between the first endpoint and the second endpoint during the communication session. The program instructions also direct the processing system to determine that the text includes a control instruction for the first endpoint and comply with the control instruction.

DETAILED DESCRIPTION

During a real-time communication session between two or more telecommunication endpoints, a text channel of the real-time communication session is leveraged to transmit control instructions to endpoints on the session. The text channel is established for carrying text-based user communications (e.g., text messages) between the endpoints on the communication session. For example, a teleconferencing client may supply a chat window through which participants on a teleconference can exchange text messages with one or more other participants outside of the audio/video communications of the teleconference. The technology described below transmits control instructions over the text channel in the same manner in which the user-to-user text communications are transmitted. An endpoint receiving the control instruction recognizes the control instruction as being such an instruction (e.g., as opposed to being a message intended for the endpoint's user) and complies with the control instruction. While the receiving endpoint is configured to recognize and comply with the control instruction, the transmitting endpoint need not be modified for transmitting the control instruction. Rather, a user of the transmitting endpoint may simply type the control instruction into an interface to the text channel (e.g., a chat window) and send the control instruction just as though the user was sending a text message to the user of the receiving endpoint.

Figure 1:
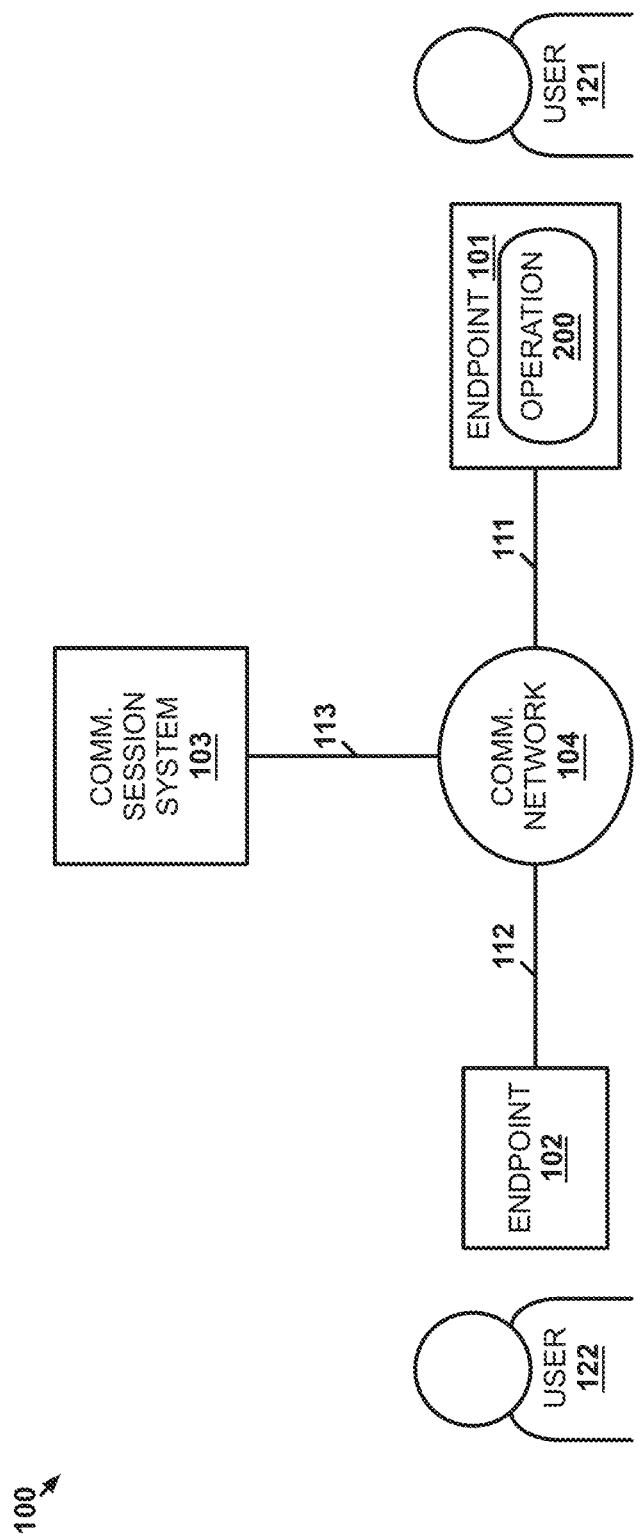
FIG. 1 illustrates an implementation for controlling an endpoint over a text channel of a real-time communication session.

FIG. 1 illustrates implementation 100 for controlling an endpoint over a text channel of a real-time communication session. Implementation 100 includes endpoint 101, endpoint 102, communication session system 103, and communication network 104.

Communication network 104 includes one or more local area networks and/or wide area computing networks, such as the Internet. Endpoint 101, endpoint 102, and communication session system 103 communicate with communication network 104 over communication links 111-113, respectively. Communication links 111-113 are shown as direct links but may include intervening systems, networks, and/or devices.

In operation, endpoint 101 and endpoint 102 may each respectively be a telephone, tablet computer, laptop computer, desktop computer, conference room system, or some other type of computing device capable of connecting to a communication session facilitated by communication session system 103. Communication session system 103 facilitates real-time communication sessions between two or more endpoints, such as endpoint 101 and endpoint 102. In some examples, communication session system 103 may be omitted in favor of a peer-to-peer communication session between endpoint 101 and endpoint 102. A communication session may include a real-time audio channel (e.g., to exchange voice communications), a real-time video channel (e.g., for video conferencing), a graphic component (e.g., presentation slides, screen sharing, etc.), and/or some other type of real-time communication (e.g., environmental or biometric data). In this example, user 122 is operating endpoint 102 and user 121 is operating endpoint 101. In some examples, endpoint 102 may not be a user operable computing device like those listed above. Rather, endpoint 102 may be an automated system that does not have an associated user 122, such as a voicemail system, an automated attendant application or an Interactive Voice Response (IVR) system. Other examples may include more than two participant users and/or more than two endpoints on the communication session.

Figure 2:
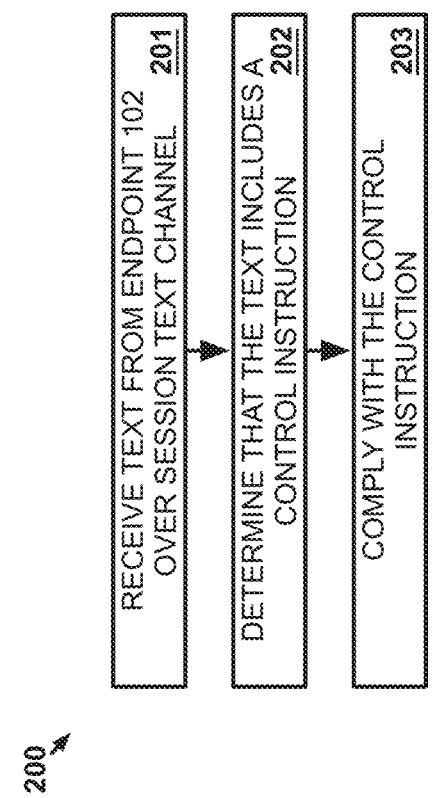
FIG. 2 illustrates an operation to control an endpoint over a text channel of a real-time communication session.

FIG. 2 illustrates operation 200 to control an endpoint over a text channel of a real-time communication session. Endpoint 101 performs operation 200 to enable transmission of command instructions over a text channel of a real-time communication session established between endpoint 101 and endpoint 102. In particular, during the communication session, endpoint 101 receives text from endpoint 102 over a text channel of the real-time communication session established between endpoint 101 and endpoint 102 (201). The real-time communication session may include only the text channel for user communications or may include one or more other channels for other communication modes (e.g., audio, video, screen sharing, presentation sharing, or other type of media). The text channel enables exchanging text-based user communications between endpoint 101 and endpoint 102 during the communication session. The text-based user communications are considered user communications because they are for presentation (e.g., display, text-to-speech playback, etc.) to one or more users participating over the communication session. For example, the user communications may be text entered by user 122 at endpoint 102 for transmission to endpoint 101 for display to user 121, or vice versa. If endpoint 102 is an unmanned system (e.g., the IVR mentioned above), then endpoint 102 may generate the text itself for transmission over the text channel to endpoint 101 for display to user 121. For example, an IVR system may adjust microphone audio capture settings (e.g., gain control settings) or transmission settings (e.g., compression) to better understand what user 121 is saying. In another example, the IVR system at a bank could activate the camera on a customer's smartphone in order to verify the customer's identity.

Although the text channel in the above examples could be a messaging channel over which text-based messages can be transferred to endpoints on the communication session (e.g., SMS), there are circumstances under which other forms of text communication might provide better performance. For example, because real-time text protocols transmit individual characters immediately after they are typed, these protocols might allow a control instruction to be received and acted upon more quickly than is achievable with methods that require the entire instruction to be completed before it is transmitted. Another implementation consideration is that, in many cases, it would be desirable to use a non-proprietary text communication protocol that is supported on a wide variety of endpoints and across a wide variety of networks. An example of a text communication technology that satisfies those considerations is the RFC-4103 real-time text protocol. This protocol was designed to be an IP-compatible replacement for traditional analog TDD/TTY devices, for use by people who are hearing and/or speech impaired as a stand-alone medium or in conjunction with other real-time media (e.g., as a way to provide streaming captions during a teleconference). Because this was its intended purpose, pending Federal Communications Commission regulations will require IP telecommunications endpoints and networks to support RFC-4103. Although not the intended purpose of RFC-4103, there does not appear to be a technical reason why it could not also be used for control instructions. Given that that there may be benefits to using a real-time text protocol (rather than a messaging protocol) for control instructions, and given also that support for text communication via RFC-4103 is likely to be required by the FCC, methods that use RFC-4103 for text-based control instruction seem likely to be a preferred implementation.

After receiving the text, endpoint 101 determines that the text includes a control instruction for endpoint 101 (202). In some examples, a predefined one or more characters present only in control instructions allows endpoint 101 to differentiate between control instructions and other received text. In alternative examples, endpoint 101 and the user associated with endpoint 101 may have different network addresses for the receipt of text, thereby making it unnecessary to embed specialized text sequences in the control instructions. The control instruction may direct endpoint 101 to perform an action with respect to a feature of endpoint 101 that is allowed for remote control by endpoint 101. For example, the control instruction may direct endpoint 101 to adjust audio settings for audio transmitted over an audio channel of the communication session. The audio settings may affect audio capture (e.g., noise cancelation, automatic gain control, sampling rate, wide or narrow pick-up for "audio zoom", or some other setting affecting the capture of audio at endpoint 101). The audio settings may also affect audio transmission (e.g., compression, encoding method, latency, or some other setting affecting the transmission of audio). Similarly, the control instruction may direct endpoint 101 to adjust video settings for video transmitted over a video channel of the communication session. The video settings may affect video capture (e.g., white balance, frame rate, resolution, zoom, or some other setting affecting capture of video at endpoint 101). The video settings may also affect video transmission (e.g., compression, encoding method, latency, frame rate (if different than the capture rate), or some other setting affecting the transmission of video). The communication session may also include channels for media types (e.g., presentation slides, screen sharing, etc.) other than captured audio and video. The control instruction in those examples may control the transmission or playback of that type of media as well. Other features that may be controlled by the control instruction include network settings (e.g., port access restrictions, firewall rules, bandwidth restrictions, network selection, etc.), peripheral device control (e.g., activating input/output devices), call control (e.g., directing the endpoint to call a different number), the selection and transmission of non-media data (e.g., biometric or environmental information), application control, or any other feature provided by endpoint 101.

User 121 may define which features are allowed to be remotely controlled by received control instructions, the hardware/software capabilities of endpoint 101 may limit which actions are allowed, security preferences for endpoint 101 may limit which actions are allowed, or some other aspect may define which actions are allowed to be controlled—including combinations thereof. For example, the actions may be limited to controlling features of the communication session (e.g., settings for the client application connected to the session) or may be allowed to affect features of endpoint 101 unrelated to the communication session (e.g., if the session is a tech support call being handled by user 122, then user 122 may be able to solve the issue via one or more control instructions sent to endpoint 101). Similarly, user 121 may enable remote control for each respective communication session or may enable remote control for any communication session that occurs while the remote control is enabled. In some examples, situations may be defined (either by a user, by default, or otherwise) where remote control is automatically enabled. For instance, endpoint 101 may automatically enable remote control in the event that user 121 places an emergency call using endpoint 101. If endpoint 102 receives the emergency call, user 122 can send control instructions to endpoint 101 to better assist with the emergency that user 121 is experiencing (e.g., a control instruction may change video capture settings on endpoint 101 so that user 122 can better see user 121's surroundings over a video channel of the communication session or a control instruction may direct endpoint 101 to begin transmitting biometric data about user 121 to endpoint 102).

The control instruction may be identified in the text by a client application executing on endpoint 101 to connect to communication session system 103, by a companion application (e.g., plugin) to such a client, by an independent application that has access to analyze text received over the text channel (e.g., may use an application programming interface), or by some other program instructions executing on endpoint 101. Endpoint 101 may identify the control instruction by comparing the text to predefined text commands in endpoint 101. The characters in the received text may, therefore, need to be an exact match to a text command known to endpoint 101. In some examples, such as when security is a priority, the text commands may consist of character sequences that do not correspond to legitimate words or phrases. Security may be enhanced even further if the text commands are encrypted using a mutually agreed upon technique. In some examples, such as when user convenience is a priority, multiple command instructions may correspond to the same action to account for different ways in which an instruction may be phrased. For instance, the text "enable AGC" and the text "turn on AGC" may be control instructions that both correspond to endpoint 101 enabling an automatic gain control setting for capturing audio from user 121 during the communication session. In other examples, endpoint 101 may use a natural language processing model, and/or other artificial intelligence model(s), to determine what action is being requested by the text. User 122 would, therefore, not necessarily need to remember the exact text required to instruct endpoint 101 to perform an action.

In some examples, an attribute of the text may indicate to endpoint 101 that a control instruction is included therein. As such, endpoint 101 will not need to check for a specific control instruction, as described above, unless the attribute is identified first. For instance, a specified character or character string before the command instruction portion of the text may indicate to endpoint 101 that a command instruction is included in the text. In another example, the packets carrying the text commands may be received at endpoint 101 via a different network port or network address than those carrying text intended for presentation to user 121.

Regardless of how the control instruction is identified, endpoint 101 complies with the identified control instruction (203). That is, endpoint 101 performs the action corresponding to the control instruction. For instance, a setting may be changed, an application may be opened/closed, an application may be triggered to perform a task, or some other allowed action may be performed. If the action occurs, at least in part, outside of software that is complying with the control instruction (e.g., the telecommunications client application), then application programming interfaces (APIs) to software elements, including an operating system of endpoint 101, necessary to comply with the control instruction may be invoked.

In some examples, prior to complying with the control instruction endpoint 101 may perform a security procedure to validate that the text was received from endpoint 102. The security procedure may include performing a mutual-authentication process between endpoint 101 and endpoint 102. The security procedure may include endpoint 101 determining whether the packets carrying the text are received from the same origin (endpoint 102 in this example) as other user communications for the communication session. A control instruction in packets not from endpoint 102 would, therefore, not be complied with. In some examples, the security procedure may be user-based where user 122 authenticates their identity and their authority to control endpoint 101. In other examples, the security procedure may be endpoint-based where the identity and authority of endpoint 102 is confirmed regardless of its user. A combination of both approaches may be used in some cases. In some examples, a multifactor-authentication token may be included in the control instruction for verification using a related interface available to endpoint 101.

Since the text is received over the text channel that is normally used for text-based user communications, even the text including a control instruction may be presented to user 121 (e.g., displayed or read aloud by endpoint 101). Presenting the text to user 121 informs user 121 about the control instruction so that user 121 is aware of the action that will be taken to comply with that control instruction. In other examples, endpoint 101 may recognize the control instruction in the text and prevent the text with the control instruction from being presented while allowing other text not including a control instruction to be presented as normal. A user preference may dictate to endpoint 101 whether the control instruction text should be presented to the user. Whether or not the text with the control instruction is presented to user 121, endpoint 101 may present an alert notifying user 121 about the action being taken to comply with the control instruction. Similarly, endpoint 101 may transmit a text response back to endpoint 102 over the text channel indicating that the control instruction has been complied with or, in the event something prevented full compliance with the control instruction (e.g., the feature being controlled by the control instruction is not allowed to be controlled or has limits on the extent to which it can be controlled), then the response may indicate that endpoint 101 was unable to comply (and may provide a reason for the non-compliance).

Figure 3:
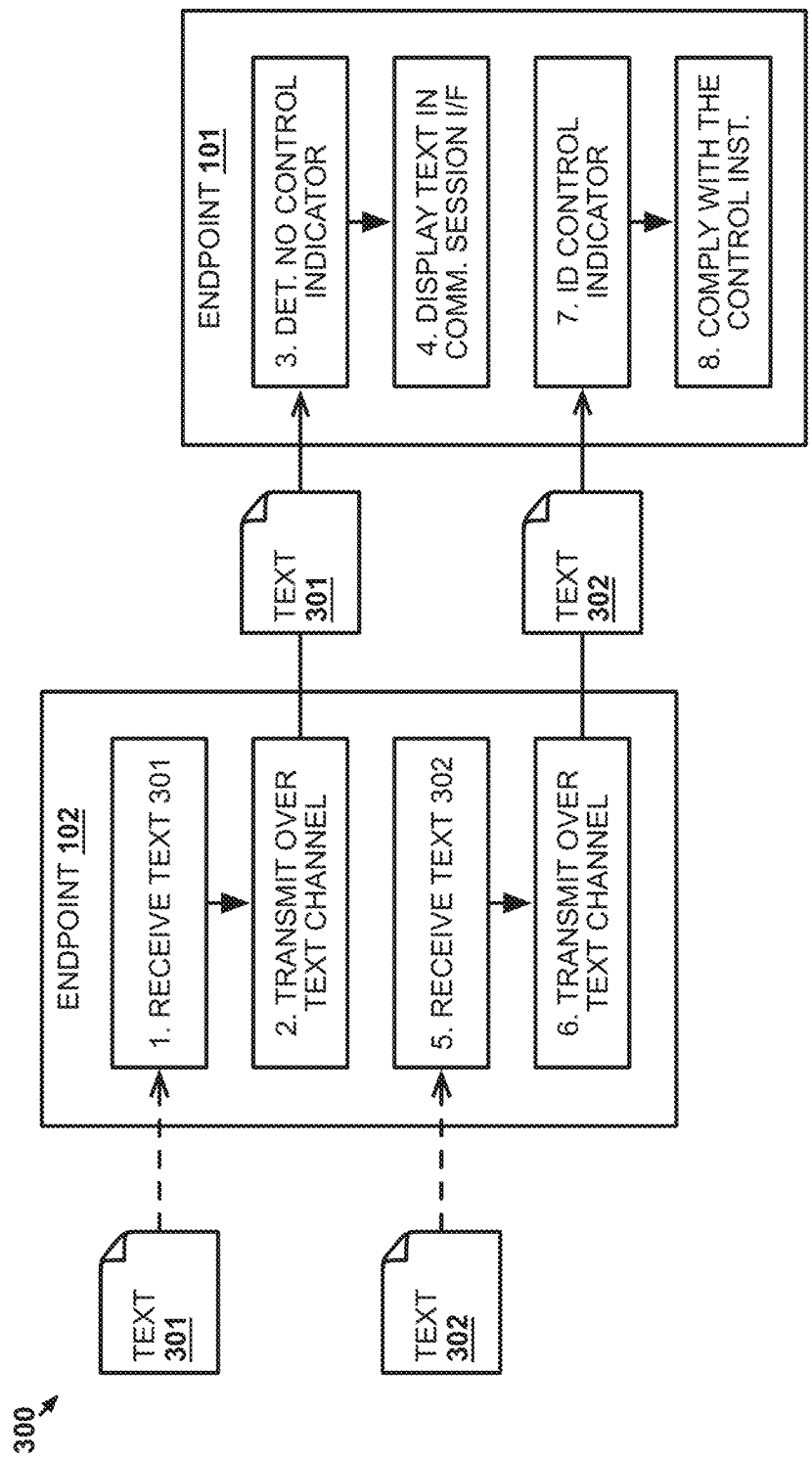
FIG. 3 illustrates an operational scenario for controlling an endpoint over a text channel of a real-time communication session.

FIG. 3 illustrates operational scenario 300 for controlling an endpoint over a text channel of a real-time communication session. Operational scenario 300 is a scenario where endpoint 102 and endpoint 101 of implementation 100 are endpoints to a real-time communication session facilitated by communication session system 103. In operational scenario 300, endpoint 102 receives text 301 at step 1. Text 301, in this example, is a message typed into endpoint 102 by user 122 with the intention that text 301 be presented by endpoint 101 to user 121. After receipt of text 301, endpoint 102 transmits text 301 to endpoint 101 at step 2 over a text channel of the established communication session. Text 301 is transmitted in a format/protocol supported by the communication channel. Upon endpoint 101 receiving text 301 over the text channel, endpoint 101 determines that no indicator of a control instruction is present within text 301 at step 3. The indicator may be a predefined character or string of characters that would be included in text 301 had user 122 intended for text 301 to include a control instruction. Since the indicator is not present, endpoint 101 simply displays text 301 at step 4 in an interface to the text channel of the communication session (e.g., a chat thread window). The display of text 301 may be no different than had endpoint 101 not determined that text 301 included a control instruction and simply treated text 301 like any other text received over the text channel.

After sending text 301, endpoint 102 receives text 302 at step 5. Text 302 is also a message typed into endpoint 102 by user 122. As such, the control instructions use characters (e.g., letters, number, symbols, etc.) that are supported by the text channel. Although, instead of simply being a message intended for presentation to user 121 at endpoint 101, text 302 includes a control instruction. As noted above, endpoint 101 determines whether an indicator is present in received text to determine whether the text includes a control instruction. User 122 has, therefore, also included the indicator in text 302 along with the control instruction. Text 302 is transmitted over the text channel at step 6 just like text 301 was transmitted over the text channel before. Upon endpoint 101 receiving text 302, endpoint 101 identifies the indicator within text 302 at step 7. Instead of simply displaying text 302 to user 121, endpoint 101 complies with the control instruction at step 8. Though not shown, endpoint 101 may also display text 302 to user 121 in addition to complying with the control instruction therein. Displaying text 302 like text 301 was displayed before makes user 121 aware of the control instruction that is affecting the operation of endpoint 101. Text 302 may be displayed as is, which relies on user 121 to recognize that text 302 includes a control instruction (e.g., by recognizing the indicator), or may be displayed with additional context information indicating that text 302 includes a control instruction and/or what the control instruction caused endpoint 101 to do (e.g., change a particular setting).

Figure 4:
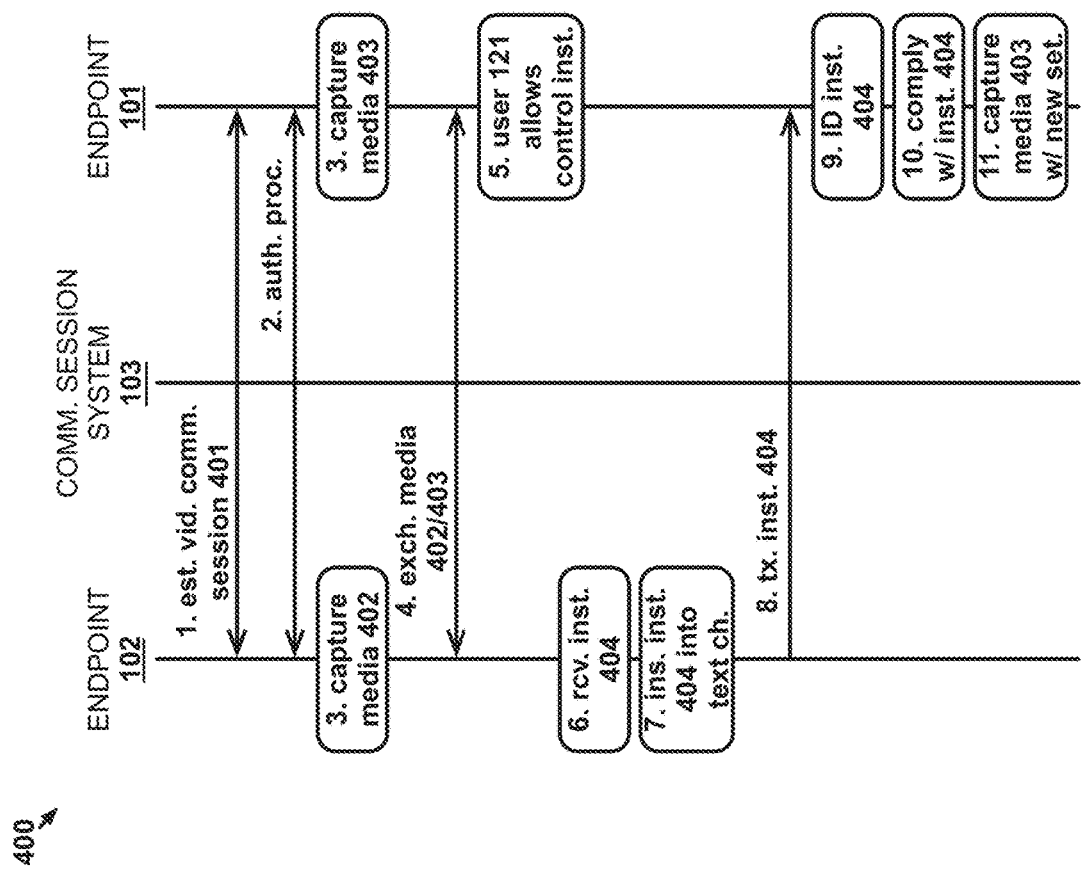
FIG. 4 illustrates an operational scenario for controlling an endpoint over a text channel of a real-time communication session.

FIG. 4 illustrates operational scenario 400 for controlling an endpoint over a text channel of a real-time communication session. In operational scenario 400, video communication session 401 facilitated by communication session system 103 is established at step 1 between endpoint 102 and endpoint 101. Video communication session 401 may be a video call initiated by one of endpoints 101 and 102 to the other, may be a conference session that endpoints 101 and 102 join, or may be some other type of real-time video communication session enabling user 121 and user 122 to have a conversation with one another. In this example, after establishing video communication session 401, endpoint 101 and endpoint 102 perform a mutual-authentication process at step 2 to ensure that text exchanged over a text channel of video communication session 401 is actually received from an endpoint on video communication session 401. During a mutual-authentication process endpoint 101 and endpoint 102 exchange credentials, such as usernames/passwords and/or key certificates, that are used to verify the respective endpoints are what they purport to be. In some examples, the mutual-authentication process may be performed during the establishment of video communication session 401 or at some other time (e.g., upon determining that a control instruction is going to be sent). Endpoint 102 and/or endpoint 101 may present the results of the mutual-authentication process (e.g., pass or fail) to inform their respective users about the results.

After video communication session 401 is established, endpoint 102 begins capturing media 402 and endpoint 101 begins capturing media 403 at step 3. While media 402 and media 403 are being captured in real time, endpoint 101 and endpoint 102 exchange media 402 and media 403 in real time at step 4 over video communication session 401. Media 402 and media 403 include any type of media exchanged over a channel of video communication session 401. In this case, since video communication session 401 enables user 121 and user 122 to speak with one another on video, media 402 and media 403 include video and audio captured of user 121 and user 122. In other examples, either user 121 or user 122 may choose to have their endpoint not capture video and/or audio (e.g., may mute their audio or video feed) or the audio or video may otherwise be disabled. Video communication session 401 also includes a text channel for user 121 and user 122 to exchange text. Text messages exchanged between over the text channel may also be considered part of media 402 and media 403.

At some point after video communication session 401 is established, user 121 directs endpoint 101 to allow control instructions over a text channel of video communication session 401 at step 5. For example, a telecommunication client application may have an interface option that user 121 can toggle to indicate their desire to allow control instructions. The interface may also enable user 121 to select which features user 121 wants to allow to be controlled. While shown occurring prior to control instruction 404 being received, in some examples, endpoint 101 may first recognize control instruction 404 and then query user 121 about whether endpoint 101 should comply with control instruction 404. In other examples, user 121 may indicate that control instructions are allowed prior to video communication session 401 being established (e.g., user 121 may allow control instructions in all communications sessions, in communication sessions with certain parties, endpoint 101 may query user 121 regarding control instructions before establishing video communication session 401, or user 121 may allow control instructions in some other manner).

Endpoint 102 receives control instruction 404 at step 6 from user 122. User 122 provides control instruction 404 into an interface to the text channel of video communication session 401. For instance, user 122 may type control instruction 404 into a text entry field for the text channel or may use a voice command on endpoint 102 to enter control instruction 404. Endpoint 102 inserts control instruction 404 into the text channel at step 7. In some examples, inserting control instruction 404 into the text channel may include user 122 selecting a "send" button in an interface provided by endpoint 102. In other examples, such as those where the text channel is a real-time text over IP channel, each character entered for control instruction 404 is immediately inserted into the text channel. Upon control instruction 404 being inserted into the text channel (either all at once, on a character-by-character basis, or otherwise), control instruction 404 is transported over the text channel at step 8 to endpoint 101.

At step 9, endpoint 101 identifies control instruction 404 in text received over the text channel. In some examples, control instruction 404 may be the only text received over the text channel while, in other examples, control instruction 404 may be only a portion of the text received over the text channel (e.g., user 121 and user 122 may be exchanging text messages between each other over the channel). Control instruction 404 may be identified based on an identifier in the text including control instruction 404 (in some cases the identifier may be considered part of control instruction 404 itself), based on control instruction 404 being received through a different port than other text messages, or may identify control instruction 404 in some other manner. After identifying control instruction 404, endpoint 101 complies with control instruction 404 at step 10. That is, endpoint 101 performs whatever action is directed by control instruction 404. In this example, control instruction 404 is a control instruction that adjusts a setting for how media 403 is captured by endpoint 101. Therefore, endpoint 101 changes the setting in accordance with control instruction 404. In some examples, if the setting is binary (e.g., on/off), then control instruction 404 simply directed endpoint 101 to enable/disable the setting. For instance, control instruction 404 may turn on or off automatic gain control or noise cancelation. In other examples, control instruction 404 may need to indicate further information describing how the setting should be changed. In an example, control instruction 404 may direct endpoint 101 to change the white balance of video captured by endpoint 101. Control instruction 404 may, therefore, define a particular color temperature to which the white balance should be set. Alternatively, control instruction 404 may indicate an amount that the setting should be adjusted (e.g., may indicate that the color temperature should be increased by a certain amount). Other manners of describing how a setting should be adjusted may also be used. In some examples, if the text channel of video communication session 401 is between more than two endpoints, control instruction 404 may indicate to which of the endpoints control instruction 404 is directed. If control instruction 404 does not indicate particular endpoint(s) that are subject to control instruction 404, then all receiving endpoints may comply with control instruction 404 by default (if compliance has been enabled thereat).

After endpoint 101 complies with control instruction 404, endpoint 101 begins capturing media 403 at step 11 (which is still being exchanged with endpoint 102 per step 4) in accordance with the updated setting (e.g., the white balance may be updated while video in media 403 continues to be captured and transmitted in real-time over video communication session 401). Updating the setting using control instruction 404 should, therefore, have the same effect on endpoint 101's operation as if the setting was updated by user 121 themselves.

Figure 5:
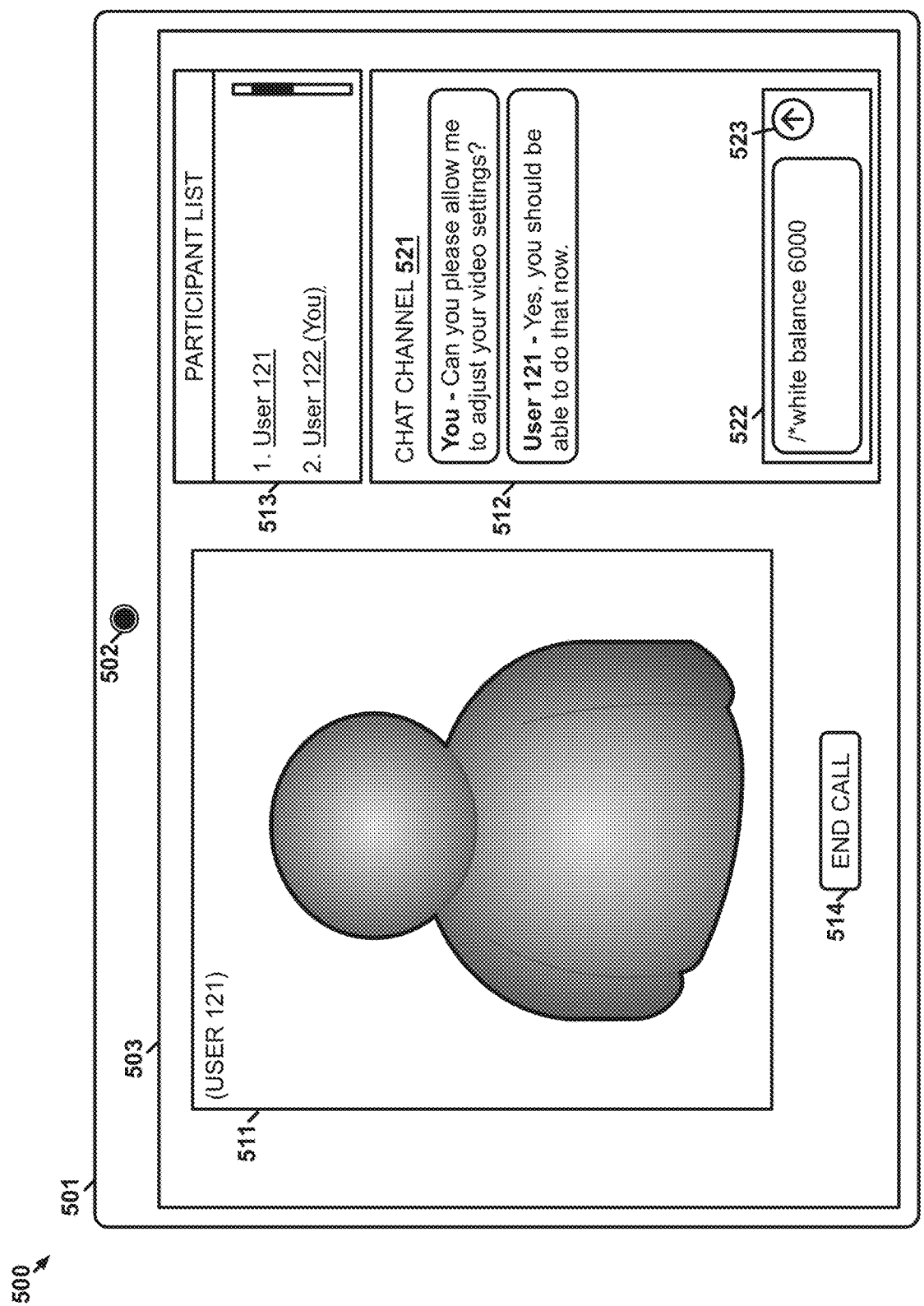
FIG. 5 illustrates a display system for controlling an endpoint over a text channel of a real-time communication session.

FIG. 5 illustrates display system 500 for controlling an endpoint over a text channel of a real-time communication session. Display system 500 is an example display system for endpoint 102, which transmits control instructions to control endpoint 101. Display system 500 includes display housing 501, camera 502, and display 503. Display 503 may be a cathode ray tube (CRT), Liquid Crystal Display (LCD), Light Emitting Diode display (LED), or some other type of display capable of presenting images described below. Camera 502 includes optics and an image sensor for capturing pictures and/or video. Camera 502 may be omitted in some examples. In some examples, display system 500 may further include a microphone and/or one or more speakers for user 122 to input and receive voice communications over communication sessions.

Display system 500 includes an example of what may be displayed by endpoint 102 to user 122 during operational scenario 400. Display 503 is displaying an example Graphical User Interface (GUI) for a telecommunication client application connected to video communication session 401. The GUI shows participant window 511, chat channel window 512, participant list 513, and end call button 514, which ends endpoint 102's connection to video communication session 401 when selected. Real-time video of user 121 is shown in participant window 511. Participant list 513 lists users 121-122 as participants on video communication session 401. Other communication sessions may include additional users.

Chat channel window 512 is an interface into chat channel 521, which is a text channel of video communication session 401. Messages are exchanged between user 121 and user 122 over chat channel 521 and displayed in chat channel window 512. User 122 enters text into text entry area 522 and selects send button 523 when the text is ready to send over chat channel 521. As shown, user 122 has used chat channel 521 to request that user 121 allow user 122 to control video settings on endpoint 101. User 121 has replied that they should now be able to do so. User 121 may have sent that reply after allowing control in step 5 of operational scenario 400.

In this example, user 122 wants to adjust the peak color temperature for the white balance of the camera capturing video of user 121 at endpoint 101 (i.e., camera 602 from display system 600 described below). To that end, user 122 types a control instruction into text entry area 522 using a two-character string "/*" that indicates that the text in the message includes a control instruction. User 122 then types a control instruction to set the white balance of the camera to have a peak color temperature of 6,000 degrees K (6000K) in a convention recognized by endpoint 101 (e.g., to change the peak color temperature from 4500K to 6000K). User 122 presses send button 523 when they are finished typing the control instruction.

Figure 6:
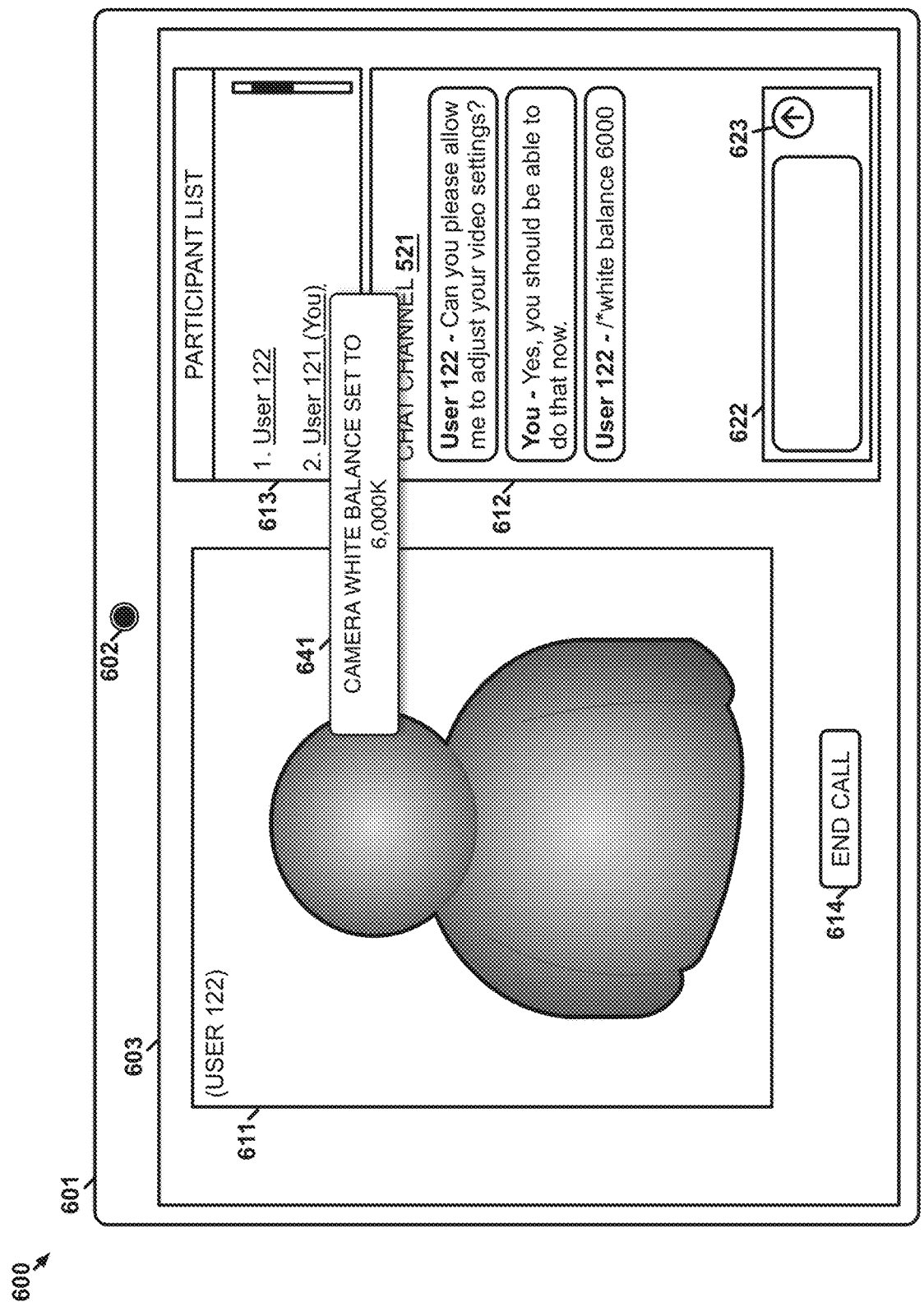
FIG. 6 illustrates a display system for controlling an endpoint over a text channel of a real-time communication session.

FIG. 6 illustrates display system 600 for controlling an endpoint over a text channel of a real-time communication session. Display system 600 is an example display system for endpoint 101, which receives control instructions from endpoint 102. Display system 600 includes display housing 601, camera 602, and display 603. Display 603 may be a cathode ray tube (CRT), Liquid Crystal Display (LCD), Light Emitting Diode display (LED), or some other type of display capable of presenting images described below. Camera 602 includes optics and an image sensor for capturing pictures and/or video. Camera 602 may be omitted in some examples. In some examples, display system 600 may further include a microphone and/or one or more speakers for user 121 to input and receive voice communications over communication sessions.

Display system 600 includes an example of what may be displayed by endpoint 101 to user 121 corresponding to what display system 500 displays to user 122 during operational scenario 400. Display 603 is displaying an example GUI for a telecommunication client application connected to video communication session 401. The GUI shows participant window 611, chat channel window 612, participant list 613, and end call button 614, which ends endpoint 101's connection to video communication session 401 when selected. Real-time video of user 122 is shown in participant window 611. Participant list 613 lists users 121-122 as participants on video communication session 401. Other communication sessions may include additional users.

Chat channel window 612 is an interface into chat channel 521. Messages are exchanged between user 121 and user 122 over chat channel 521 and displayed in chat channel window 612. User 121 enters text into text entry area 622 and selects send button 623 when the text is ready to send over chat channel 521. As shown, user 121 has used chat channel 521 to reply to user 122's request that user 121 allow user 122 to control video settings on endpoint 101. User 121 may have sent that reply after allowing control in step 5 of operational scenario 400. Chat channel window 612 also displays a message from user 122 that includes the control instruction that user 122 typed into text entry area 522 above and sent to endpoint 101 over chat channel 521. In some examples, upon endpoint 101 determining that the message from endpoint 102 included a control instruction, endpoint 101 may have prevented the control message from being displayed in chat channel window 612.

The GUI in this example is also showing alert window 641 which notifies user 122 that endpoint 101 has complied with the control instruction. Alert window 641 explicitly describes what has been changed in endpoint 101 based on the control instruction (i.e., that the camera white balance has been set to a peak temperature of 6,000K). Alert window 641 may close after a period of time or user 121 may close alert window 641 manually. Other manners of notifying user 121 about control instruction compliance may also be used (e.g., an alert tone or audio message) and, in some examples, endpoint 101 may simply comply with the control instruction without alerting user 121. In some examples, endpoint 101 may notify endpoint 102 after complying with the control instruction. The notification may be transmitted over chat channel 521 as well. For instance, endpoint 101 may display in chat channel window 612 and chat channel window 512 as though it was sent by user 121. Although, in some cases, the message may note that it is an automated response from automatically generate a message and send the message over chat channel 521. The message endpoint 101. In other examples, user 121 and/or user 122 may be alerted by their respective endpoints should endpoint 101 be unable to comply with the control instruction. For instance, endpoint 101 may not be able to comply, or may only be able to partially comply, with the control instruction for some reason (e.g., an error may occur in control communications with camera 602 or camera 602 may be incapable of a 6000K peak color temperature). The alert in these examples may explain why endpoint 101 cannot comply (e.g., camera control error) and/or, especially in the case of partial compliance, explain what endpoint 101 was able to do (e.g., may explain that the peak color temperature was set to a maximum value allowed by camera 602, such as 5500K, rather than the full 6000K).

Figure 7:
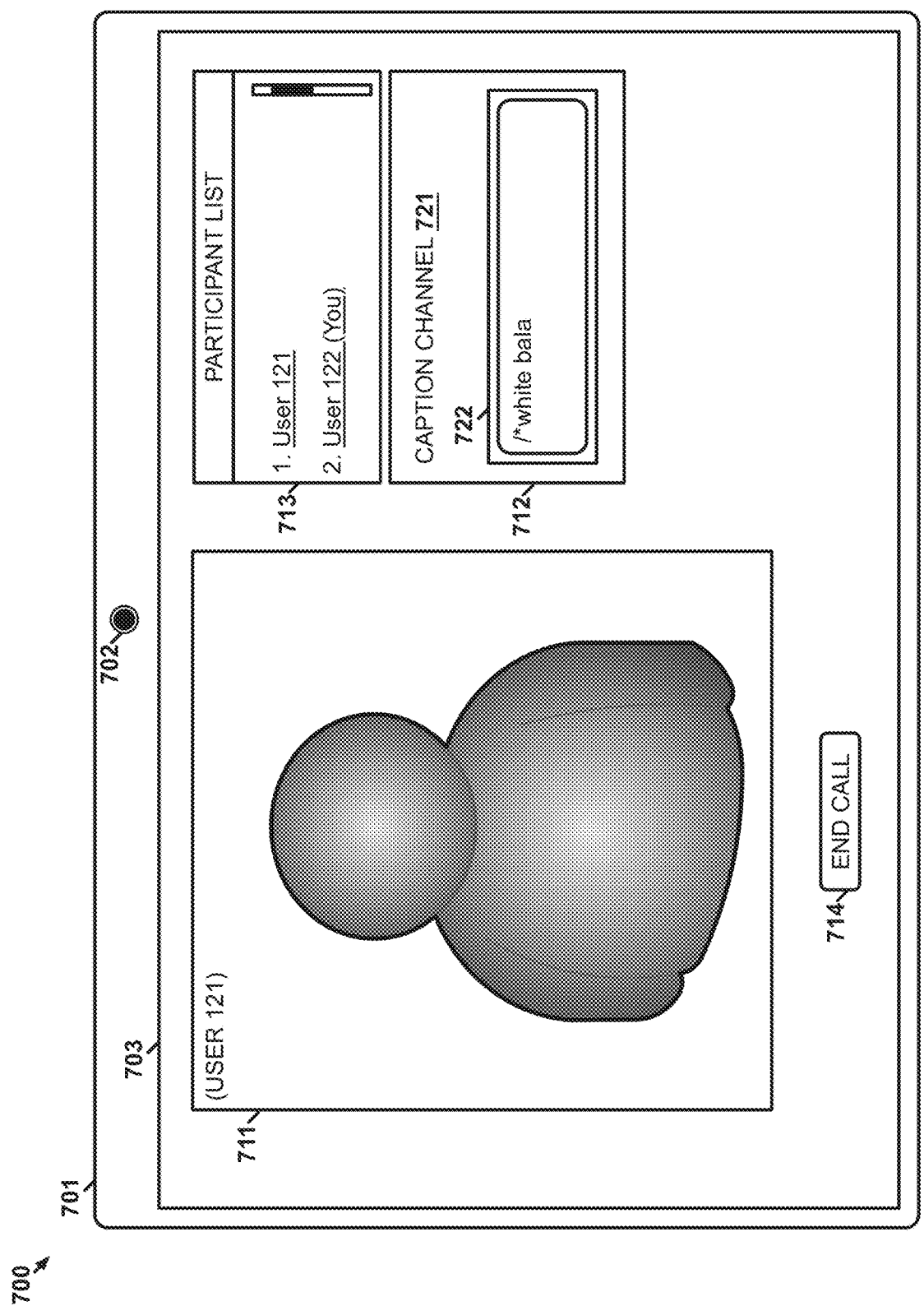
FIG. 7 illustrates a display system for controlling an endpoint over a text channel of a real-time communication session.

FIG. 7 illustrates a display system for controlling an endpoint over a text channel of a real-time communication session. Display system 700 is another example display system for endpoint 102, which transmits control instructions to control endpoint 101. Display system 700 includes display housing 701, camera 702, and display 703. Display 703 may be a cathode ray tube (CRT), Liquid Crystal Display (LCD), Light Emitting Diode display (LED), or some other type of display capable of presenting images described below. Camera 702 includes optics and an image sensor for capturing pictures and/or video. Camera 702 may be omitted in some examples. In some examples, display system 700 may further include a microphone and/or one or more speakers for user 122 to input and receive voice communications over communication sessions.

Display system 700 includes another example of what may be displayed by endpoint 102 to user 122 during operational scenario 400. Display 703 is displaying an example GUI for a telecommunication client application connected to video communication session 401. The GUI shows participant window 711, caption channel window 712, participant list 713, and end call button 714, which ends endpoint 102's connection to video communication session 401 when selected. Real-time video of user 121 is shown in participant window 711. Participant list 713 lists users 121-122 as participants on video communication session 401. Other communication sessions may include additional users.

Caption channel window 712 is an interface into caption channel 721, which is a text channel of video communication session 401. Caption channel 721 is a real-time text over IP channel, such as an RFC-4103 channel, that may typically be used for sending text captions of user 122's speech to endpoint 101 for display thereat to user 121. In this case, endpoint 102 is using caption channel 721 to send control instructions. As such, caption channel window 712 provides an interface into caption channel 721 for such control instructions. Like the example above, in this example, user 122 wants to adjust the white balance of the camera capturing video of user 121 at endpoint 101 (i.e., camera 802 from display system 800 described below). To that end, user 122 types a control instruction into text entry area 722 using a two-character string "/*" that indicates that the text in the message includes a control instruction. User 122 then begins to type a control instruction into text entry area 722 to set the white balance of the camera to 6000K in a convention recognized by endpoint 101. The control instruction is the same as that shown in text entry area 522 of display system 500 but user 122 has not yet completed typing. There is no send button in text entry area 722 because each character is sent over caption channel 721 as it is typed. In some examples, user 122 may press an "ENTER" button on endpoint 102, which causes a corresponding character to be sent over caption channel 721. That character may be recognized by endpoint 101 as being the end of the control instruction.

Figure 8:
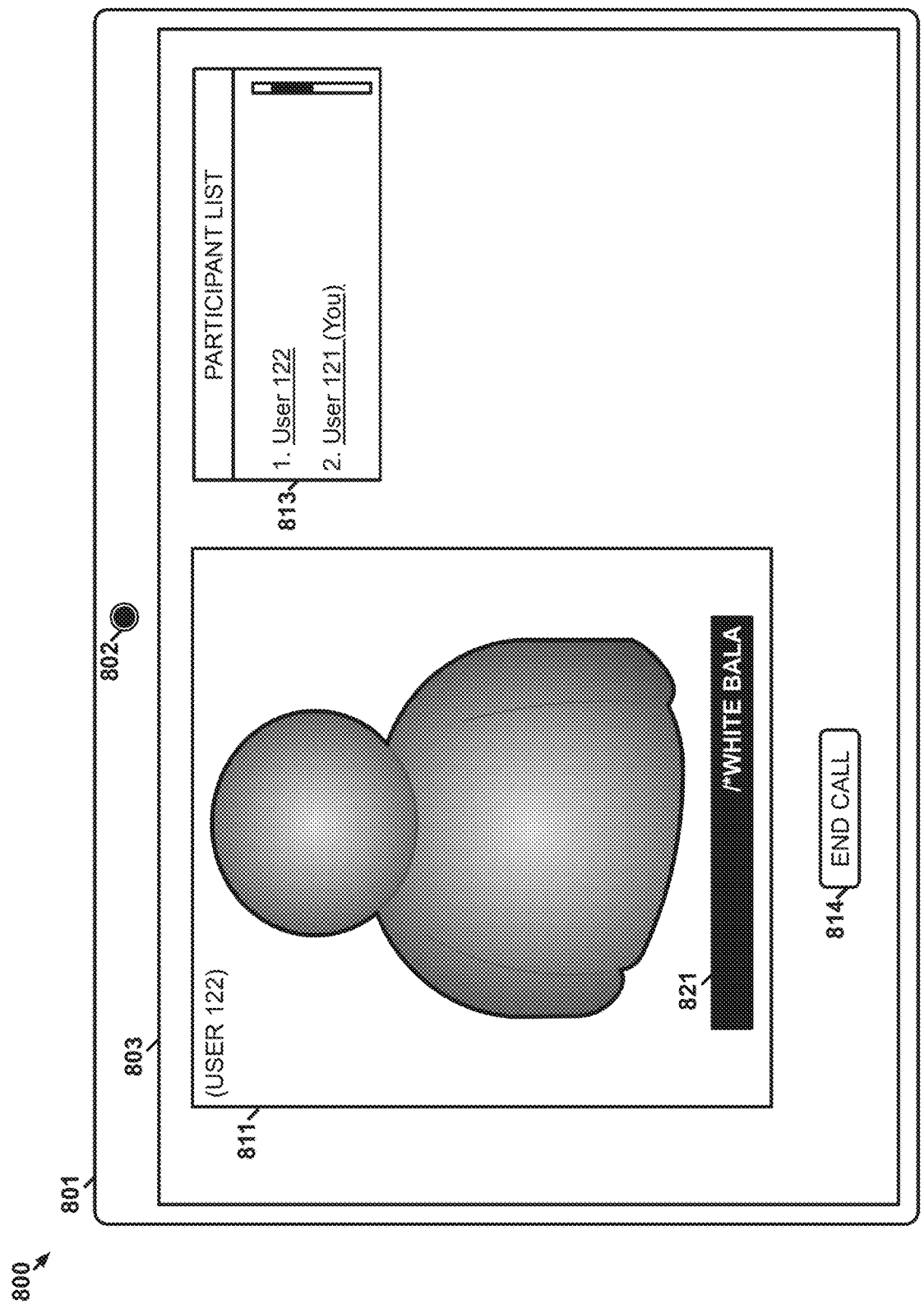
FIG. 8 illustrates a display system for controlling an endpoint over a text channel of a real-time communication session.

FIG. 8 illustrates a display system 800 for controlling an endpoint over a text channel of a real-time communication session. Display system 800 is an example display system for endpoint 101, which receives control instructions from endpoint 102. Display system 800 includes display housing 801, camera 802, and display 803. Display 803 may be a cathode ray tube (CRT), Liquid Crystal Display (LCD), Light Emitting Diode display (LED), or some other type of display capable of presenting images described below. Camera 802 includes optics and an image sensor for capturing pictures and/or video. Camera 802 may be omitted in some examples. In some examples, display system 800 may further include a microphone and/or one or more speakers for user 121 to input and receive voice communications over communication sessions.

Display system 800 includes an example of what may be displayed by endpoint 101 to user 121 corresponding to what display system 700 displays to user 122 during operational scenario 400. Display 803 is displaying an example GUI for a telecommunication client application connected to video communication session 401. The GUI shows participant window 811, participant list 813, and end call button 814, which ends endpoint 101's connection to video communication session 401 when selected. Real-time video of user 122 is shown in participant window 811. Participant list 813 lists users 121-122 as participants on video communication session 401. Other communication sessions may include additional users.

Caption area 821 is shown in participant window 811 to scroll text captions of what user 122 is saying from right to left across caption area 821. Other manners of displaying text captions may be used in other examples. Since each character typed into text entry area 722 is sent in real time to endpoint 101 from endpoint 102, caption area 821 is presently displaying only those characters that user 122 has typed into text entry area 722. Since the characters lead with "/*", endpoint 101 recognizes that the following characters will be a control instruction to endpoint 101.

Figure 9:
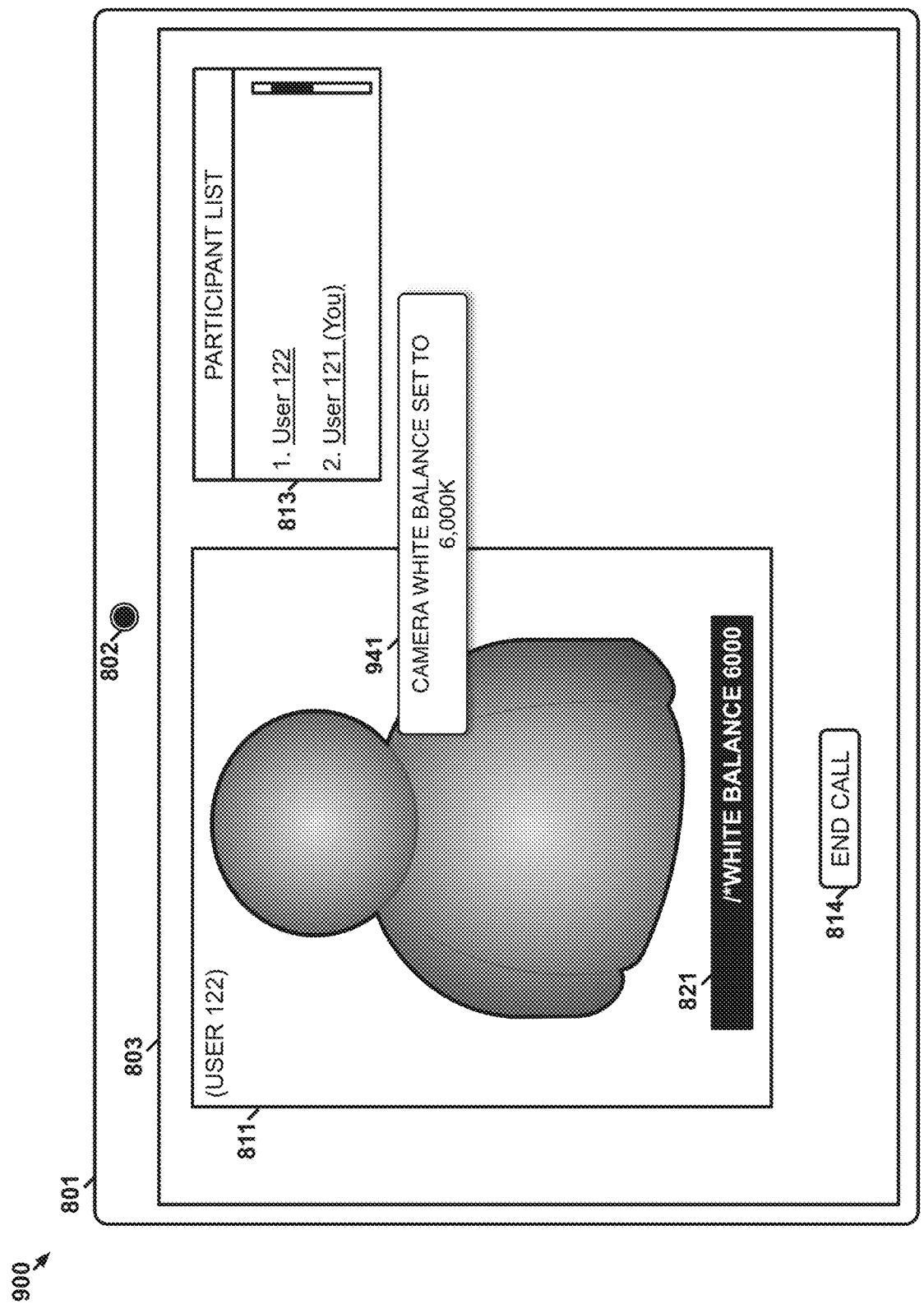
FIG. 9 illustrates a display system for controlling an endpoint over a text channel of a real-time communication session.

FIG. 9 illustrates display system 900 for controlling an endpoint over a text channel of a real-time communication session. Display system 900 is an example of display system 800 after user 122 has completed typing the control instruction and the entire control instruction has been received by endpoint 102. The entire control system is, therefore, now shown in caption area 821 by display system 900. Once endpoint 101 has determined that the full control instructions has been received, endpoint 101 complies with the control instruction and displays alert window 941 to alert user 121 about the change to the white balance setting that was made. Since the control instruction is received on a character-by-character basis, endpoint 101 cannot simply assume that all text in a particular message is the control message. Rather, endpoint 101 may compare the text to defined control messages until a match is found. For example, the "white bala" displayed by in display system 800 would not match one of the defined control messages, so endpoint 101 would continue to wait for remaining characters. Similarly, endpoint 101 may wait a pre-defined amount of time after receiving a most recent character should the presently received characters represent a complete control instruction while additional characters could also represent a control instruction. For instance, after receiving the first three characters of 6000 in the illustrated control instruction, endpoint 101 may be able to set the white balance to 600K. However, endpoint 101 waits to ensure the value should not be larger before complying with the control instruction. In this case, waiting allowed an extra zero to be received and the white balance was set to 6000K rather than 600K. In alternative examples, other manners of indicating that the control instruction is complete may be used, such as the addition of special character(s) at the end of the instruction (e.g., end the instruction with another "/*" or using the "ENTER" character mentioned above).

In further examples, endpoint 101 may compare the already received characters of a control instruction to the pool of possible control instructions. When endpoint 101 determines that there is only one control instruction from the pool that matches even the already received characters, then endpoint 101 may comply with the one control instruction immediately rather than waiting for the rest of the characters to be received. For example, the command instruction may be "turn on noise cancelation" (with a "/*" at the beginning if using the convention described above). When the characters "turn on noise c" are received by endpoint 101, endpoint 101 may determine that "turn on noise cancelation" is the only possible control instruction that can result from those already received characters. Endpoint 101 may, therefore, toggle a noise cancelation feature of endpoint 101 to comply with the control instruction rather than wait for the remaining characters to be received.

Figure 10:
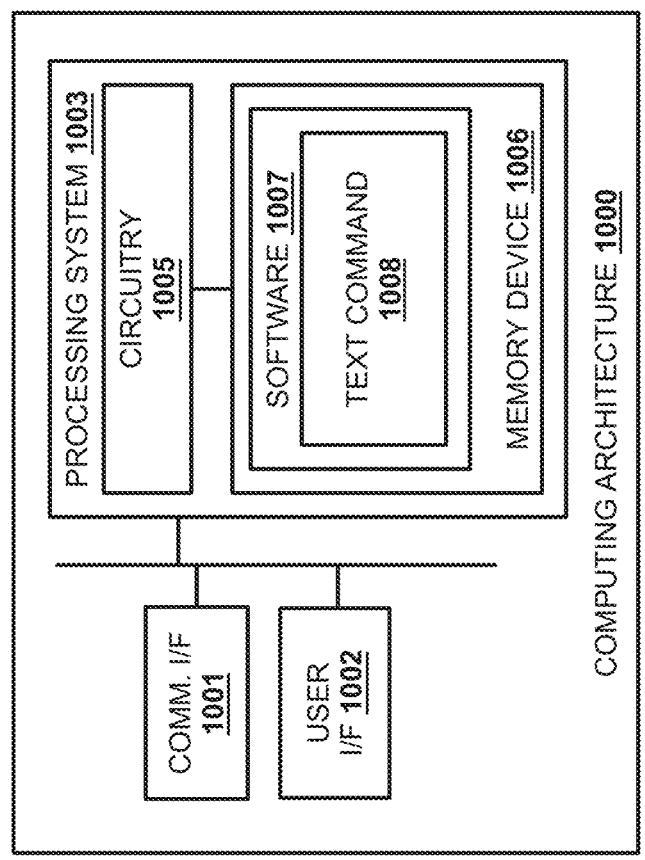
FIG. 10 illustrates a computing architecture for controlling an endpoint over a text channel of a real-time communication session.

FIG. 10 illustrates computing architecture 1000 for controlling an endpoint over a text channel of a real-time communication session. Computing architecture 1000 is an example computing architecture for endpoint 101, although endpoint 101 may use alternative configurations. Other computing systems herein, such as communication session system 103 and endpoint 102 may also use computing architecture 1000. Computing architecture 1000 comprises communication interface 1001, user interface 1002, and processing system 1003. Processing system 1003 is linked to communication interface 1001 and user interface 1002. Processing system 1003 includes processing circuitry 1005 and memory device 1006 that stores operating software 1007.

Communication interface 1001 comprises components that communicate over communication links, such as network cards, ports, RF transceivers, processing circuitry and software, or some other communication devices. Communication interface 1001 may be configured to communicate over metallic, wireless, or optical links. Communication interface 1001 may be configured to use TDM, IP, Ethernet, optical networking, wireless protocols, communication signaling, or some other communication format—including combinations thereof.

User interface 1002 comprises components that interact with a user. User interface 1002 may include a keyboard, display screen, mouse, touch pad, or some other user input/output apparatus. User interface 1002 may be omitted in some examples.

Processing circuitry 1005 comprises microprocessor and other circuitry that retrieves and executes operating software 1007 from memory device 1006. Memory device 1006 comprises a computer readable storage medium, such as a disk drive, flash drive, data storage circuitry, or some other memory apparatus. In no examples would a computer readable storage medium of memory device 1006, or any other computer readable storage medium herein, be considered a transitory form of signal transmission (often referred to as "signals per se"), such as a propagating electrical or electromagnetic signal or carrier wave. Operating software 1007 comprises computer programs, firmware, or some other form of machine-readable processing instructions. Operating software 1007 includes text-command module 1008. Operating software 1007 may further include an operating system, utilities, drivers, network interfaces, applications, or some other type of software. When executed by processing circuitry 1005, operating software 1007 directs processing system 1003 to operate computing architecture 1000 as described herein.

In particular, text-command module 1008 directs processing system 1003 to receive text from a second endpoint over a text channel of a real-time voice communication session established between the first endpoint (implemented by computing architecture 1000) and the second endpoint. The text channel enables exchanging text-based user communications between the first endpoint and the second endpoint during the communication session. Text-command module 1008 also directs processing system 1003 to determine that the text includes a control instruction for the first endpoint and comply with the control instruction.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method comprising:
   in a first endpoint operated by a first user:
      receiving text from a second endpoint over a text channel of a real-time communication session established between the first endpoint and the second endpoint, wherein the text channel enables exchanging text-based user communications between the first endpoint and the second endpoint during the real-time communication session;
      determining that the text includes a control instruction for the first endpoint rather than a message intended for the first user, wherein the control instruction directs the first endpoint to perform an action; and
      complying with the control instruction.

2. The method of claim 1, wherein determining that the text includes the control instruction comprises:
   identifying a predefined one or more characters in the text that differentiates the control instruction from other text transmitted over the text channel to the first endpoint.

3. The method of claim 1, comprising:
   in response to determining that the text should be displayed to the first user, displaying the text to the first user.

4. The method of claim 1, wherein the real-time communication session includes a voice channel and wherein the action includes adjusting audio settings for audio transmitted to the second endpoint over the voice channel.

5. The method of claim 1, wherein the real-time communication session includes a video channel and wherein the action includes adjusting video settings for video transmitted to the second endpoint over the video channel.

6. The method of claim 1, wherein the real-time communication session includes a media channel and wherein the action includes adjusting media presentation settings for media received from the second endpoint over the media channel.

7. The method of claim 1, comprising:
   receiving user input from the first user allowing the first endpoint to comply with the control instruction.

8. The method of claim 7, wherein the user input indicates features of the first endpoint that are allowed to be controlled by the control instruction.

9. The method of claim 1, comprising:
   validating that the text is received from the second endpoint.

10. The method of claim 9, wherein validating that the text is received from the second endpoint comprises:
    performing a mutual-authentication process between the first endpoint and the second endpoint.

11. The method of claim 9, wherein validating that the text is received from the second endpoint comprises:
    determining that the text is received from a same source as media packets for the real-time communication session.

12. The method of claim 1, wherein the text channel comprises first Real-time Transport Protocol (RTP) packets transmitted with second RTP packets of a real-time voice channel of the real-time communication session.

13. An apparatus comprising:
    one or more computer readable storage media;
    a processing system operatively coupled with the one or more computer readable storage media; and
    program instructions stored on the one or more computer readable storage media that, when read and executed by the processing system, direct the processing system to:
       in a first endpoint operated by a first user:
          receive text from a second endpoint over a text channel of a real-time voice communication session established between the first endpoint and the second endpoint, wherein the text channel enables exchanging text-based user communications between the first endpoint and the second endpoint during the real-time voice communication session;
          determine that the text includes a control instruction for the first endpoint rather than a message intended for the first user, wherein the control instruction directs the first endpoint to perform an action; and
          comply with the control instruction.

14. The apparatus of claim 13, wherein to determine that the text includes the control instruction, the program instructions direct the processing system to:
    identify a predefined one or more characters in the text that differentiates the control instruction from other text transmitted over the text channel to the first endpoint.

15. The apparatus of claim 13, wherein the real-time voice communication session includes a voice channel and wherein the action includes adjusting audio settings for audio transmitted to the second endpoint over the voice channel.

16. The apparatus of claim 13, wherein the real-time voice communication session includes a video channel and wherein the action includes adjusting video settings for video transmitted to the second endpoint over the video channel.

17. The apparatus of claim 13, wherein the real-time voice communication session includes a media channel and wherein the action includes adjusting media presentation settings for media received from the second endpoint over the media channel.

18. The apparatus of claim 13, wherein the program instructions direct the processing system to:

receive user input from the first user allowing the first endpoint to comply with the control instruction, wherein the user input indicates features of the first endpoint that are allowed to be controlled by the control instruction.

19. The apparatus of claim 13, wherein the program instructions direct the processing system to:

validate that the text is received from the second endpoint comprising one or more of:

perform a mutual-authentication process between the first endpoint and the second endpoint; and determine that the text is received from a same source as media packets for the real-time voice communication session.

20. One or more computer readable storage media having program instructions stored thereon that, when read and executed by a processing system, direct the processing system to:

in a first endpoint operated by a first user:

receive text from a second endpoint over a text channel of a real-time communication session established between the first endpoint and the second endpoint, wherein the text channel enables exchanging text-based user communications between the first endpoint and the second endpoint during the real-time communication session;

determine that the text includes a control instruction for the first endpoint rather than a message intended for the first user, wherein the control instruction directs the first endpoint to perform an action; and comply with the control instruction.

* * * * *